(No Model.)
W. M. HINMAN.
PNEUMATIC CASH CARRIER APPARATUS.
No. 395,273. Patented Dec. 25, 1888.
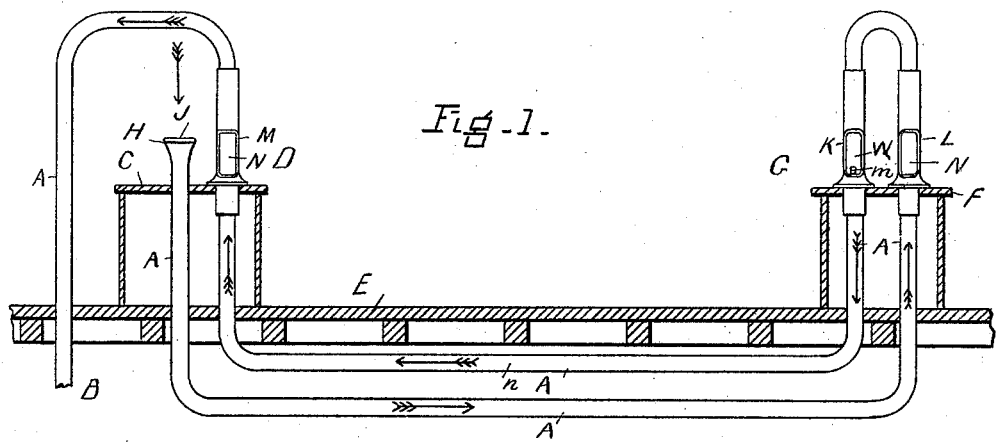
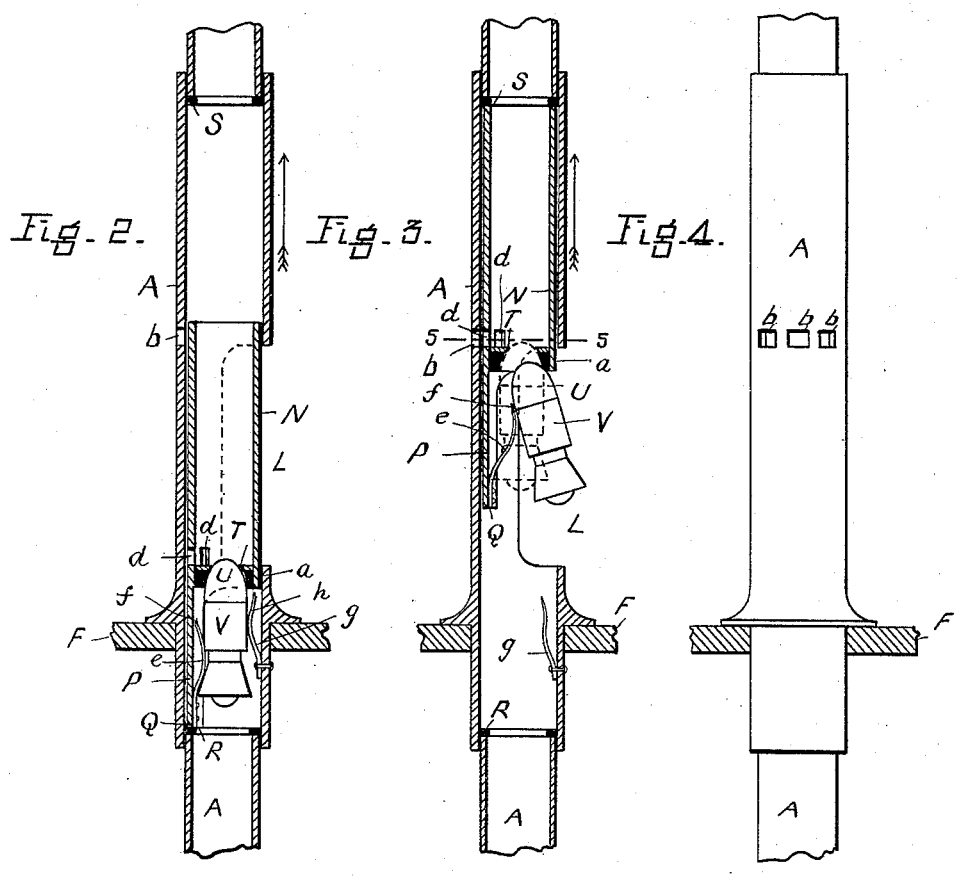
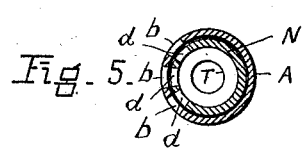
Witnesses.
Percy Bryant.
C. E. Nichls.
Inventor.
William M. Hinman.
per Edwin W. Brown.
Attorney.

UNITED STATES PATENT OFFICE.

WILLIAM M. HINMAN, OF BOSTON, MASSACHUSETTS, ASSIGNOR TO THE METEOR DESPATCH COMPANY, OF PORTLAND, MAINE.

PNEUMATIC CASH-CARRIER APPARATUS.

SPECIFICATION forming part of Letters Patent No. 395,273, dated December 25, 1888.

Application filed April 30, 1888. Serial No. 272,392. (No model.)

*To all whom it may concern:*

Be it known that I, WILLIAM M. HINMAN, of Boston, in the county of Suffolk and State of Massachusetts, have invented certain new and useful Improvements in Pneumatic Cash-Carrier Apparatus, of which the following is a full, clear, and exact description.

This invention relates to improvements in cash-carrier apparatus, in which pneumatic tubes are used for the transmission of cash-carriers or other articles therethrough; and the invention consists in the combination, with a pneumatic tube suitably arranged and adapted for the transmission of a carrier or other article therethrough, by means of an air exhaust or pressure apparatus in suitable connection therewith, (said tube having an opening at any desired point or place in the side of the tube for the delivery thereat of a carrier or other article, and one or more openings or passages near said delivery-opening,) of a valve arranged to move back and forth over said opening to open and close said opening, and operated by the exhaustion or pressure of air as the carrier or other article makes connection therewith, to move away from and open said opening and bring the carrier or other article opposite thereto for its delivery thereat, and provided with one or more openings or passages through it, which, as the valve is moved away from opposite said delivery opening or outlet, will be opposite to or coincident with the opening in said pneumatic tube, near the delivery-opening, for the entrance of air into the pneumatic tube through said openings, all substantially as hereinafter fully described; and the invention also consists in the combination, with a pneumatic tube suitably arranged and adapted for the transmission of a carrier or other article therethrough by means of an air exhaust or pressure apparatus in suitable connection therewith, (said tube having an opening at any desired point or place in the side of the tube for the delivery thereat of a carrier or other article, said tube being provided with a suitable opening or openings or passages near said delivery-opening,) of a valve arranged to move back and forth within said tube to open and close said opening, and operated by the exhaustion or pressure of air as the carrier or other article makes connection therewith, to move away from and open said opening and bring the carrier or other article opposite thereto for its delivery thereat, and provided with one or more openings or passages through it and a spring, so that as the valve is moved away from opposite said delivery opening or outlet the opening or openings in the valve will be opposite to or coincident with said opening or openings in the pneumatic tube, near the delivery opening or outlet, for the entrance of air into the pneumatic tube for the release or disengagement of the carrier or other article from said valve, for said spring to then operate upon the carrier or other article to force or push it out of said delivery opening or outlet, all substantially as hereinafter fully described; and the invention consists of other arrangements of parts in connection therewith, all substantially as hereinafter fully described.

In the drawings is illustrated, in Figure 1, a pneumatic tube between and connecting two stations for the transmission therethrough from one station to the other, and vice versa, of a carrier or other article, and arranged for operation by means of an air-exhausting apparatus; Figs. 2 and 3, detail longitudinal central sectional views from front to rear of the pneumatic tube at one of the delivery-openings, Fig. 2 showing the valve closed and Fig. 3 as opened and the carrier as forced or pushed out at said opening; Fig. 4, a rear view of Fig. 2, and Fig. 5 a cross-section on line 5 5, Fig. 3.

In the drawings, A represents a pneumatic tube for the transmission of a carrier or other article therethrough, and to be connected at its end B to any suitable air-exhaust apparatus, but not needing to be herein shown or described. The tube extends therefrom to the table C at the station D, thence down through the same and below the floor E, to and up through the same and a table, F, at the other station, G, and then returns down through the table F and back through the floor and the table C at station D, where it terminates in a vertical position, having its end H open and preferably flaring, all substantially as shown in Fig. 1 in side elevation. The tube A has two receiving-openings for the reception of a carrier or other article to be transmitted through the tube, one, J, being the open end H at station D, and the other, K, at the station G, and two outlets or delivery-openings, L M, in the front side of the tube A, respectively at stations G and D, for the delivery from the tube of a carrier or other article transmitted through the tube from one of the receiving-openings. Each of the outlets or delivery-openings L M has a valve, N, and the description of the construction, arrangement, and operation of one will answer for both, one being a duplicate of the other, and such opening and the construction and arrangement of its valve are shown in Figs. 2 to 5. The openings K, L, and M are made in the front side of the tube in any suitable manner, and each is of a length and width for the carrier to be easily inserted into or removed from the tube at each opening.

The valve or gate N is made in the present instance of a short tube open from end to end, its external diameter fitting closely the internal diameter of the tube A, but so that it can freely slide back and forth or up and down in said pneumatic tube and yet maintain a close fit to substantially prevent air from passing between the two, and it is of a length when opposite its opening in the pneumatic tube to extend each way a short distance above and below the opening to practically close the opening when over it to the escape of air therefrom or entrance thereto, as shown in Fig. 2.

The valve has a downwardly-extending arm or portion, P, on its back side, and when the valve is in its normal or lowest or closed position, as shown in Fig. 2, it rests by the lower end Q of such arm upon a shoulder, R, of the tube, and when in its highest position or fully open, as shown in Fig. 3, its upper end abuts against a shoulder, S, of the tube, by which the valve is limited in its downward and upward or closing and opening movements. Its lower end $a$ is shaped to form a seat, T, which is of a construction to receive the end U of the carrier V—in the present instance circular in cross-section, as shown in Fig. 2—to close the same to the passage of air through the valve.

The operation so far as has been described is as follows: The air-exhausting apparatus, having been put in operation by its connection with the pneumatic tube at its end B, acts to draw or suck air from and through the tube A in the direction of the arrows shown in Fig. 1 and in Figs. 2 and 3. The carrier V is then, for instance, placed in the opening J at the flaring end H of the pneumatic tube at the station D, its pointed end downward, when from the action of the air-exhaust apparatus exhausting air in the tube in front of it the carrier will pass along the pneumatic tube until it arrives at the outlet or opening L at the other station, G, where it makes by its end U a close union with the seat T of the valve N. The valve then moves with it because of the closing of the lower end of the valve by the carrier to the passage of air therethrough along the pneumatic tube until the valve is stopped by its abutment against the flange or shoulder S, the valve then being away from the opening L and the carrier opposite thereto, as shown in Fig. 3 in dotted lines, the opening being free and clear for the carrier to be then removed from the tube at such opening.

The invention thus far described in its construction and operation is the subject of a pending application for Letters Patent of J. L. Given, filed November 22, 1887, Serial No. 255,900, and its operation is such that when the carrier arrives at the delivery-opening and the valve is opened, as shown in Fig. 3 in dotted lines, the continued operation of the air-exhaust apparatus tends by its suction to hold the carrier to its seat on the valve, and thus prevents its discharge of itself at the delivery-opening, requiring more or less force to remove it therefrom; and the object of the present invention is to cause the release of the carrier from its engagement with the valve-seat as soon as it arrives at the delivery-opening, so that it can then be forced or moved out of the pneumatic tube at the delivery-opening onto the table, or in any suitable receptacle, and this is accomplished as will now be described.

In the pneumatic tube A, just above the delivery-opening, and preferably at the back side of the tube or opposite to the delivery-opening, is a series of holes or openings, $b\ b$, making communication between the exterior and interior of the tube A, and in the back side of the valve N is a series of holes or openings, $d$, corresponding to the holes or openings $b$ in the pneumatic tube, and so located in the valve that when the valve is in its uppermost position—that is, away from the delivery-opening, and leaving it free for the carrier to be removed therefrom, as shown in Fig. 3—the said valve-openings $d$ will be opposite to or coincident with the openings $b$ in the pneumatic tube, so that air can then pass through said openings into or out of the tube, and when the valve is in its lowermost position, closing the delivery-opening L, as shown in Fig. 2, the upper end of the valve will be over and cover the openings $b$ in the pneumatic tube, and close them to the passage of air through them into or out of the tube.

On the inner side, near the lower end of the arm P of the valve, below the seat end T, is secured a flat spring, $e$, its free end $f$ projecting upward and into the central portion of the pneumatic tube A, and on the inside of the pneumatic tube, just below the delivery-opening and about opposite to the valve-spring $e$, when the valve is down in its closed position, is secured a flat spring, $g$, its free end $h$ extending upward and projecting into the central portion of the pneumatic tube, as shown in the drawings.

When the carrier has arrived at and joined the valve, as shown in Fig. 2, for its delivery at the outlet or delivery-opening L, it passes between the two springs $e$ $g$, as shown in Fig. 2, and in the upward and opening movement of the valve and the continued movement of the carrier when the valve is fully opened, the valve-openings $d$ then being opposite to the openings $b$ in the pneumatic tube, air will then pass from the outside of the pneumatic tube through these openings into the valve and be drawn by the operation of the air-exhaust apparatus in the direction of the arrow, Fig. 3, which will correspondingly relieve the air-pressure upon and behind the carrier and thus lessen its hold upon the valve-seat, so that then the spring $e$, secured to the downward extension of the valve, will by its tension act to move or throw the carrier out of the delivery-opening, as shown in Fig. 3, when, the valve being open or free for air to pass through it, its gravity will cause it to fall and return to its closed position over the opening.

The object of the spring $g$, secured to the tube, is to prevent the spring $e$ on the valve—when in the position shown, for instance, in Fig. 2—pressing the carrier sidewise against the side of the tube, which would have a tendency to more or less injure one or the other, and also prevent the carrier being moved more or less from its seat on the valve before the valve is fully open and the carrier opposite to the delivery-opening. Thus the openings $d$ $b$ in the valve and pneumatic tube when opposite to or coincident with each other serve to release the carrier from the valve-seat, and at the same time the spring $e$ will act to force or throw the carrier out of the tube at the delivery-opening onto the table or into any suitable receptacle.

A greater or less number of holes or openings $b$ $d$ can be used and arranged in any suitable manner and in any suitable place other than as herein particularly described and shown; also, if the pneumatic tube should extend from station to station above or in the upper part of the room in lieu of below, the carrier in its approach to its delivery-opening would come from above. Therefore, all the parts would be reversed—that is, the openings $b$ below and the spring $g$ above the delivery-opening, the spring $e$ and opening $d$ and seat T of the valve at the opposite end, the valve being held in and made to return to its normal position after the carrier is delivered by a spring or other suitable means, and the air exhausted from the tube in the opposite direction for the proper action of all parts.

When desirous of returning the carrier from the station G to the station D, it is placed in the opening K, which is closed by a valve, W, like the valve N, except that it has no seat T, the valve being opened by taking hold of its knob or handle $m$ and raising it, and then inserting the carrier point downward and closing the valve, which will fall by its gravity, it having a suitable rest for its proper position to close the opening K, when by the operation of the air-exhaust apparatus the carrier will move along the portion $n$ of the tube and be delivered at the outlet or delivery-opening M in the same manner that has been described for its delivery at the opening L.

The spring $e$ can be dispensed with and the openings $b$ $d$ used alone; but it is preferable to use the spring in combination therewith, for even if the carrier were freed from the valve without the spring $e$ it might fall back into the pneumatic tube and interfere with the proper operation of the valve, but with the spring it would be moved sidewise out of the delivery-opening sufficient for it to fall out of the pneumatic tube.

Having thus described my invention, what I claim is—

1. The combination, with a pneumatic tube for the transmission therethrough of a carrier or other article provided with an opening or outlet for the delivery thereat of the carrier or other article, and one or more openings, $b$, near said delivery-opening, of a valve arranged to move back and forth to open and close said delivery-opening and adapted to receive the carrier, substantially as described, and provided with one or more openings, $d$, for the purpose specified.

2. The combination, with a pneumatic tube for the transmission therethrough of a carrier or other article provided with an opening or outlet for the delivery thereat of the carrier or other article, and one or more openings, $b$, near said delivery-opening, of a valve arranged to move back and forth to open and close said delivery-opening and adapted to receive the carrier, substantially as described, and provided with a spring, $e$, and one or more openings, $d$, for the purpose specified.

3. The combination, with a pneumatic tube for the transmission therethrough of a carrier or other article provided with an opening or outlet for the delivery thereat of the carrier or other article, and one or more openings, $d$, near said delivery-opening, and a spring, $g$, of a valve provided with a spring, $e$, and arranged to move back and forth to open and close said delivery-opening and adapted to receive the carrier, substantially as described, and provided with one or more openings, $b$, for the purpose specified.

4. The combination, with a pneumatic tube for the transmission therethrough of a carrier or other article provided with an opening or outlet for the delivery thereat of a carrier or other article, and a spring, $g$, of a valve provided with a spring, $e$, and arranged to move back and forth to open and close said opening and adapted to receive the carrier, substantially as described, for the purpose specified.

5. The combination, with a pneumatic tube for the transmission therethrough of a carrier or other article provided with an opening or outlet for the delivery thereat of a carrier or other article, of a valve provided with a spring, *e*, and arranged to move back and forth to open and close said opening and adapted to receive the carrier, substantially as described, for the purpose specified.

In testimony whereof I have hereunto set my hand in the presence of two subscribing witnesses.

WILLIAM M. HINMAN.

Witnesses:
 EDWIN W. BROWN,
 C. E. NICHOLS.